United States Patent [19]

Skantar et al.

[11] Patent Number: 5,415,465
[45] Date of Patent: May 16, 1995

[54] APPARATUS AND METHOD OF BAILING OFF THE BRAKE CYLINDER PRESSURE ON A LOCOMOTIVE CONSIST

[75] Inventors: Elmer T. Skantar, East Pittsburgh; Leonard Roselli, Verona, both of Pa.

[73] Assignee: Westinghouse Air Brake Company, Wilmerding, Pa.

[21] Appl. No.: 69,323

[22] Filed: Jun. 1, 1993

[51] Int. Cl.$^6$ .............................................. B60T 13/74
[52] U.S. Cl. ........................................ 303/3; 303/16; 303/20; 303/51; 364/426.01
[58] Field of Search ................... 303/3, 15, 16, 20, 36, 303/37, 38, 50, 51; 364/426.01

[56] References Cited

U.S. PATENT DOCUMENTS

| | | | |
|---|---|---|---|
| 3,583,771 | 6/1971 | Dressler | 303/20 |
| 5,172,316 | 12/1992 | Root et al. | 303/15 X |
| 5,192,118 | 3/1993 | Balukin et al. | 303/16 X |
| 5,286,096 | 2/1994 | Ferri et al. | 303/15 |

Primary Examiner—Robert J. Oberleitner
Assistant Examiner—Lee W. Young
Attorney, Agent, or Firm—John B. Sotak

[57] ABSTRACT

An apparatus for initiating and latching a bail-off request for depleting the automatic brake pressure in the brake cylinders of a locomotive consist including a cab control unit having an automatic brake handle and an independent brake handle. A central processing unit receives a first input signal from the cab control unit which is indicative of the number of locomotives in the consist and receives a second input signal from the cab control unit which signifies a bail-off request. A display screen receives input signals from the central processing unit for exhibiting either a setup screen or a normal running screen in the locomotive. An electropneumatic unit receives an input signal from the central processing unit for initiating the bail-off of the automatic brakes on the locomotive consist when the independent brake handle is placed in a bail-off position.

15 Claims, 3 Drawing Sheets

APPARATUS AND METHOD OF BAILING OFF THE BRAKE CYLINDER PRESSURE ON A LOCOMOTIVE CONSIST

FIELD OF THE INVENTION

This invention relates to a method of bailing off the automatic brake and, more particularly, to apparatus for allowing an engineer to initiate and latch a bail-off request for removing automatic brake pressure from the brake cylinders on a locomotive consist by holding the independent brake handle in a bail-off position for a given period of time and for permitting the engineer to abort the bail-off request by moving the independent brake handle out of the bail-off position prior to the expiration of the given period of time.

BACKGROUND OF THE INVENTION

In a typical railway train braking system, the air brake pressure that is developed in the locomotive brake cylinders is controlled by either the automatic brake control handle or the independent brake control handle. In certain situations, it may be desirable to bail-off or release the air pressure in the locomotive brake cylinders which is caused by the automatic brake application to allow the brakes on the locomotive consist to be independently controlled from the brakes on the remaining vehicles of the train. For example, when a train is descending a grade, it may be advisable to release the brakes on the locomotive consist to prevent bunching of the trailing vehicles of the train. This releasing action is referred to as bailing-off of the locomotive brakes. In a multiple locomotive consist, the manipulation of the independent brake handle on the lead locomotive causes the pneumatic propagation of air to the remaining locomotives of the consist by way of an air pipe connecting each of the locomotive independent brake in series. The air pipe is known as the #20 independent application and release pipe (IARP). In addition to the above-noted air pipe, there is an air pipe called the #13 quick release pipe (QRP) whose function is to pneumatically propagate a bail-off request from the lead locomotive to the trailing locomotives of the consist. In practice, the independent brake handle provides the means of controlling the pressure in the locomotive brake cylinders irrespective of the automatic brake handle position or the state of the automatic brake pressure on the train. To direct air pressure into the locomotive brake cylinders, the engineer manually moves the independent brake handle into an application zone or region. This causes air under pressure to be then directed through the #20 independent application and release pipe and, in turn, to the brake cylinders in proportion to the air pressure in the #20 pipe. The amount of air pressure in the brake cylinders is directly proportional to the extent of the independent handle movement into the application zone. In order to release and exhaust the air in #20 pipe, the engineer simply manually moves the independent brake handle to the release position. That is, to release the air from only the locomotive brake cylinders during an automatic brake application, the engineer, the train operator in the lead locomotive moves the independent brake handle in a lateral direction. At the same time, the air under pressure in the locomotive brake cylinders can be retained, exhausted or reapplied by selectively moving independent brake handle between the release and application positions. When a number of locomotives are operated in tandem, it is important to remember that a bail-off operation requires a sufficient period of time to charge the quick release pipe (QRP) to a required actuating level on the trailing locomotives in the consist. In a conventional braking system, the engineer must estimate the amount of time to hold the independent brake handle in the bail-off position. If the engineer does not hold the independent brake handle in a bail-off position for a long enough period of time, the air pressure in the #13 quick release pipe will not reach the actuating level of twenty-five pounds per square inch (25 psi) on the trailing locomotives in the consist so that the brakes on these locomotives remain applied thereby resulting in an undesirable residual braking action. A rule of thumb is that a time period of four seconds (4 sec.) for each locomotive in the consist should be adequate time to charge the #13 quick release pipe on the last locomotive. For example, if there are three locomotives in the consist, the independent brake handle should be held in the bail-off position for twelve seconds (12 sec.).

OBJECTS AND SUMMARY OF THE INVENTION

Accordingly, it is an object of this invention to provide a new and improved bail-off arrangement which informs an engineer how long the independent brake handle should be held in a bail-off position to complete a bail-off request in a locomotive consist.

Another object of this invention is to provide a unique method of notifying a train operator that the bail-off request is complete and the independent brake handle may be removed from the bail-off position.

A further object of this invention is to provide novel apparatus employing a microprocessor for receiving a first input signal signifying the locomotive consist, a second input signal representing a bail-off request, and a third input signal connoting the pressure in a quick release pipe and for producing a first output for initiating a bail-off command and a second output for reporting the time remaining to completion of the bail-off and for annunciating completion of the bail-off.

Still a further object of this invention is to provide an improved bail-off system for preventing undesirable residual braking action to take place in a locomotive consist as a result of not maintaining the independent brake handle in the bail-off position for a sufficient period of time.

Still another object of this invention is to provide an improved method of latching a bail-off request and computing and initiating a bail-off cycle of a sufficient time duration to allow the brakes on all of the locomotives in a consist to bail-off completely.

Yet a further object of this invention is to provide a microprocessor system which permits an engineer of a locomotive consist to regain control of a latched bail-off process by sensing any movement of the independent brake handle while the bail-off cycle is in progress to permit the engineer to abort the bail-off request.

Yet another object of this invention is to provide a unique bail-off arrangement which informs an engineer of the time remaining in the bail-off cycle and also informs the engineer to release the independent brake handle when the bail-off cycle is completed by displaying the appropriate information on an illuminated message screen.

An additional object of this invention is to provide apparatus for initiating and latching a bail-off request for bailing off the automatic brake pressure on a locomotive consist comprising, a cab control unit having an automatic brake handle and an independent brake handle, a central processing unit receiving a first input signal from the cab control unit which signifies the number of locomotives in a consist, and receiving a second input signal from the cab control unit which signifies a bail-off request, a display unit receiving signals from the central processing unit for exhibiting setup and normal running conditions on the locomotive consist, and electropneumatic unit receiving a signal from the central processing unit for initiating the bail-off of the automatic brakes on the locomotive consist by placing the independent brake handle in a bail-off position.

Yet an additional object of this invention is to provide a method of bailing off the automatic brakes on a locomotive consist comprising the steps of:

(a) initiating a bail-off request by moving an independent brake handle to a bail-off position;
(b) charging a quick release pipe on the locomotive consist;
(c) latching the bail-off request;
(d) timing the remaining time in the bail-off cycle, and
(e) displaying the bail-off cycle is complete, the independent brake handle may be released, or the bail-off cycle is aborted.

DESCRIPTION OF THE DRAWINGS

The above objects and other attendant features and advantages will be more readily appreciated as the present invention becomes better understood by reference to the following detailed description when considered in conjunction with the accompanying drawings, wherein:

FIG. 2A is placed above FIG. 2B, illustrating the functional sub-routine carried out by the system as shown in FIG. 1.

DETAILED DESCRIPTION OF THE INVENTION

Figure 1:
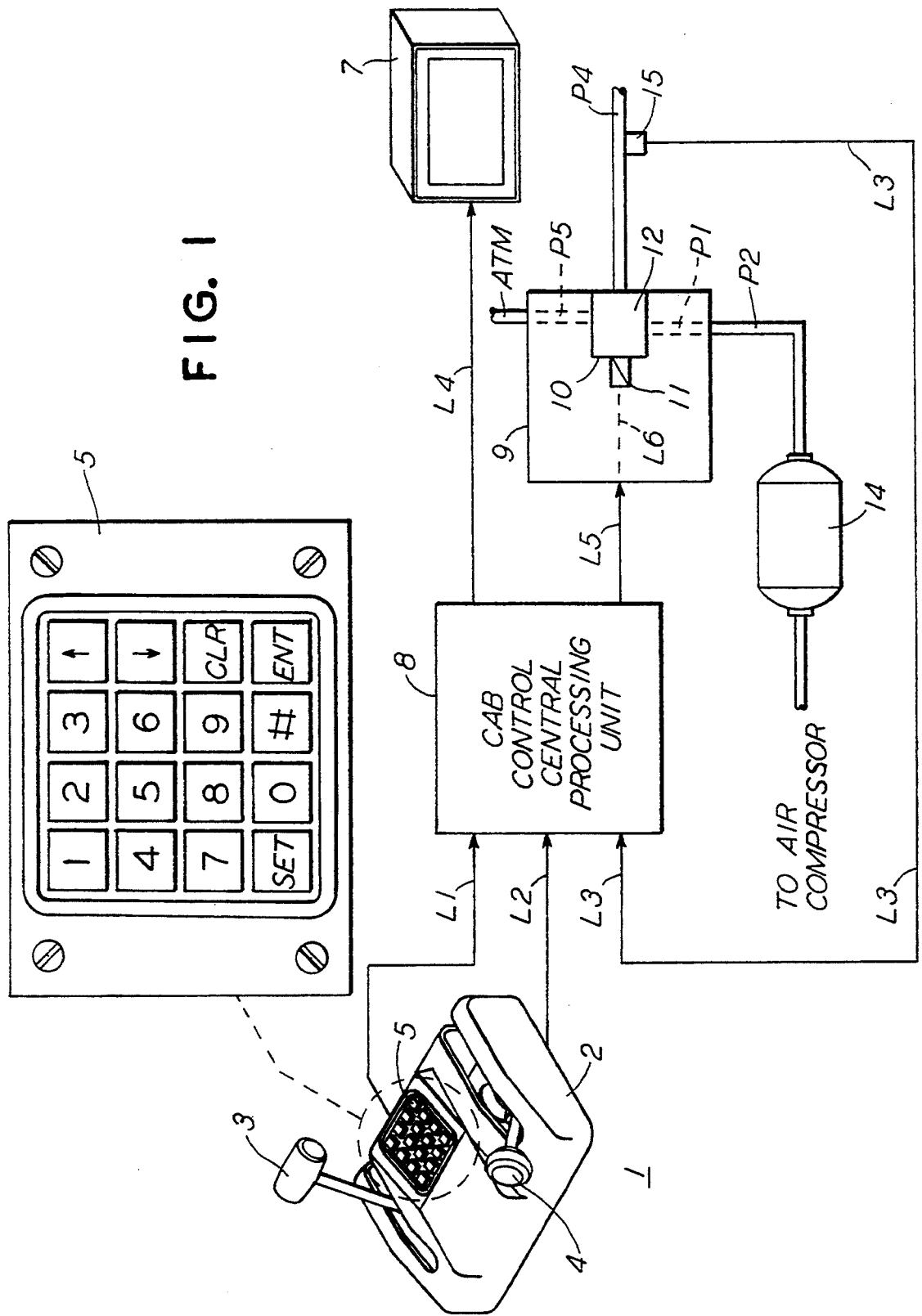
FIG. 1 is a partial diagrammatic and block schematic drawing of the apparatus and method of performing a bail-off operation on a railway locomotive consist in accordance with the present invention.

Referring now to the drawings, and in particular to FIG. 1, there is shown the equipment used to carry out a bail-off procedure which is controlled by the engineer in the lead locomotive of a consist of locomotives of a railway train in accordance with the present invention. As shown, the bail-off operation is controlled by a cab control unit 1 which may take the form of a pedestal control stand or a desk style console. In the present instance, console control unit 1 is suitably mounted within easy reach of the operating engineer in the cab of the railway locomotive. The control console 1 includes a protective housing 2 which is shown and disclosed in U.S. Pat. No. Des. 319,423, entitled "Locomotive Brake Console" and U.S. Pat. No. 5,086,644, entitled "Arrangement for Dynamic Calibrating An Absolute Position Encoder" both of which are assigned to the assignee of the subject application. The cab control unit 1 includes a first automatic brake handle 3 which is rotatable between a brake release, minimum service, full service, suppression and emergency positions, and a second independent brake handle 4 which is rotatable from a brake release position and through a brake application zone. The cab control unit 1 also includes a sixteen-pushbutton keypad 5. Whenever the SET key is depressed, a setup screen is shown on the face of the cab display unit 7, as will be described hereinafter.

It will be noted a cab control central processing unit (CPU) 8 includes at least three (3) inputs and provides a pair of outputs as shown in FIG. 1. A first input is derived from the keypad 5 and is connected to the cab control central processing unit CPU 8 via lead L1. A second input is derived from the independent brake handle 4 so that a bail-off signal is selectively developed on lead L2. The third input is a feedback signal which appears on lead lead L3. The first output of the cab control CPU 8 is connected to the input of the cab display unit 7 via lead L4, while the second output of the cab control CPU 8 is connected to an electropneumatic operating unit 9 which provides the electric and pneumatic interface and control functions. As shown in FIG. 1, the operating unit 9 contains a three-way normally closed electromagnetic or solenoid valve 10 which is manufactured by KIP Incorporated of Farmington, Conn., or Skinner Valve Division of New Britain, Conn. The solenoid valve 10 includes an electric coil 11 which is selectively energized via a conductor L6. The solenoid valve includes a pneumatic portion 12 having an inlet which is connected to the output of a main reservoir 14 via pipes or conduits P1 and P2. The input of the main reservoir 14 is connected to a suitable air compressor (not shown) via pipe or conduit P3. One outlet of the pneumatic portion 12 is connected to the No. 13 quick release actuating pipe P4 while another outlet is connected to atmosphere via exhaust pipe P5. In operation, the pneumatic portion 12 connects the pipe P1 to pipe P4 when the electric coil 11 is energized and, conversely, the pneumatic portion 12 connects the pipe P4 to Pipe P5 when the electric coil 11 is deenergized. In other words, the actuating pipe P4 is opened to pipes P1 and P2 and is pressurized by the air in reservoir 14 when the coil 10 is energized. At the same time, the communication to pipe P5 is closed when the coil 10 is energized. Now when the coil 10 is deenergized, the communication between pipe P1 and pipe P4 is closed and pipe P4 is opened to pipe P5 and atmosphere. A pressure transducer 15 senses the pressure in the actuating pipe P4 and produces a proportional electrical signal which is fed back to the cab control CPU 8 via lead L3. Actually, a pressure switch which is set at about 25 psi is used for the feedback signal While the present system can be used on locomotives in freight or passenger service, the forthcoming discussion and the related function and operation will be directed to an installation of freight locomotives. Let us assume that the train is ready to get underway and that the engineer of the lead locomotive of the consist activates the setup screen by pressing the SET key of the keypad 5 to exhibit the following display menu:

```
┌─────────────────────────────────────────────────────────────────┐
│  SELECT  OPERATION         ( ENTER  WHEN  DONE)                 │
│ ─ ─ ─ ─ ─ ─ ─ ─ ─ ─ ─ ─ ─ ─ ─ ─ ─ ─ ─ ─ ─ ─ ─ ─ ─ ─ ─ ─        │
│   [ 1 ]   EQ.  SETUP ─>8 0         [ 5 ]  CONSIST  NO.  ─>  1   │
│   [ 2 ]   LEAD/ TRAI L                                          │
│   [ 3 ]   CUT ─I N/ CUT ─OUT                                    │
│   [ 4 ]   PASSENGER/ FREIGHT                                    │
└─────────────────────────────────────────────────────────────────┘
```

SET ─UP  SCREEN

The various operational changes are made by key selection of the corresponding numbered designation appearing on the above-noted screen. For example, the pressing of the number 1 key enables the engineer to condition a possible pressure change in the equalizing reservoir. As shown above, the selected equalizing pressure is equal to eighty pounds per square inch (80 psi). The up and down keys (arrow keys) on the keypad 5 permits an increase or decrease of pressure of the equalizing reservoir. The repeated depression of the number 2 key alternates the lead and trail selection. Likewise, the repeated depression of the number 3 key alternates the cut-in and cut-out function. Similarly, the repeated depression of the number 4 key alternates the freight and passenger mode of operation of the locomotive. The selection of the number 5 key permits the entry of the exact number of locomotives in the consist. After each of the particular keys on the keypad 5 is depressed, the ENTER (ENT) key on keypad 5 is depressed to download the selected variables into the cab control and brake control CPU's and actual setup occurs. Any necessary correction of the keypad selection, before the ENTER (ENT) key is depressed, may be made after the clear (CLR) key is depressed, which does not alter the brake system, but only affects the screen display.

Next, the ENTER (ENT) key normally is activated to display the run time screen or menu which replaces the setup screen:

motive or on the multi-locomotive consist, he simply moves the independent brake handle 4 to a bail-off position which in the present instance is normal to the arcuate movement of the handle from a release to an application position.

Figure 2A:
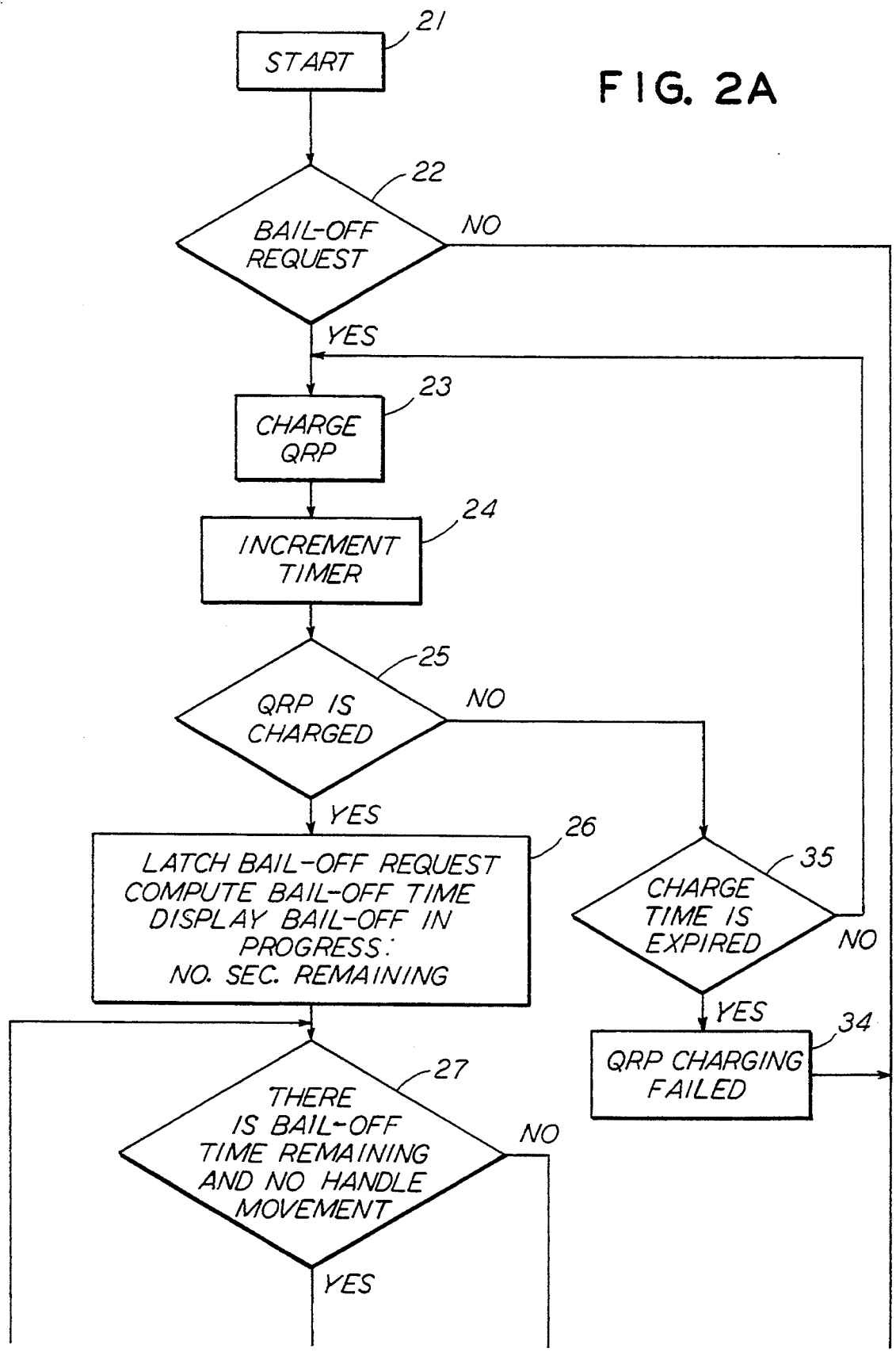
FIGS. 2A and 2B form a flow chart, when
Figure 2B:
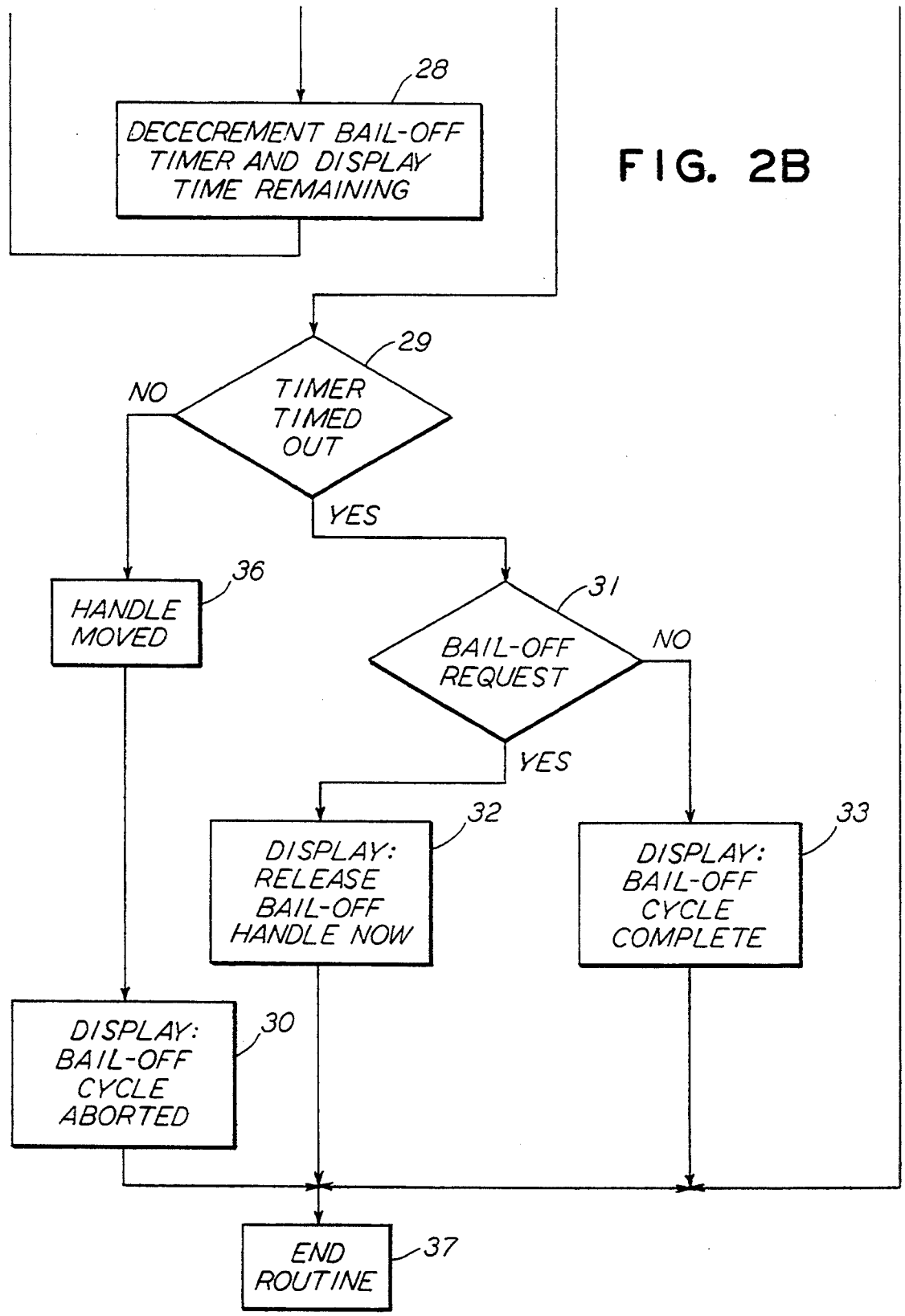

Turn now to the flow chart of FIGS. 2A and 2B. It will be seen that a sequence of operations is initiated by a start signal emanating from the START block 21. The start signal is fed to a BAIL-OFF REQUEST decision block 22 which outputs a "YES" if there is a bail-off request pending and outputs a "NO" if no bail-off request is pending. The "NO" signal is directly fed to the END ROUTINE block 37 to terminate the operation. Conversely, the "YES" signal from the BAIL-OFF REQUEST block 22 is fed to CHARGE QRP block 23 which functions to attempt to charge the quick release pipe P4. The output of the CHARGE QRP block 23 is transferred to the INCREMENT TIMER block 24 which activates an incremental software timer which signifies how much longer to hold the independent brake handle in the bail-off position. The output of the INCREMENT TIMER block 24 is fed to the QRP IS CHARGED decision block 25 which checks the pressure in the quick release pipe to determine if a bail-off cycle has started and outputs a "YES" if the quick release pipe pressure is sufficient, and outputs a "NO" if the quick release pipe pressure is not sufficient to start a bail-off cycle. The "YES" signal from block 25 is fed to

```
┌─────────────────────────────────────────────────────────────────┐
│  EQ.  RES.   ──────>8 0      BRAKE  PIPE ──────>  8 0           │
│  BRK.  REDUCTI ON─>  0       BRAKE  CYLI NDER ─>  0 0           │
│  EQ. RES.   SETUP ──>8 0     MAI N  RESERVOI R ─>1 3 1          │
│  SPEED  ( MP H) ────>0 0     AI R  FLOW ( CFM) ─>    0          │
│                                                                 │
│  LEAD ■.    FREIGHT ■        CUTIN ■     CONSIST: 1             │
└─────────────────────────────────────────────────────────────────┘
```

It will be noted that the normal run time screen shows the operating parameters or status of a single lead locomotive, consist 1, operating in a freight service mode, brake pipe is cut-in. As shown, the pressures of the equalizing reservoir and the brake pipe are at 80 psi. The air flow is zero cubic feet per minute (0 cfm) since the system is fully charged. The brakes are not applied since the brake reduction is 0 psi, and neither the automatic nor independent brake is applied since the brake cylinder pressure is also 0 psi. The pressure in the main reservoir is 131 psi. The vigilance has been reset by the engineer since there is no flash warning, and there is no emergency brake application in effect since there is no illuminated indication. The speed of the train is at zero miles per hour (0 mph) with the brake system being released and the train is ready for the application of the throttle.

Let us now assume that the train is underway and that brakes on the train are in an application state. Now if the engineer desires to release the brake on the single locoblock 26, which functions to latch the bail-off request, to compute the bail-off cycle length which is based on a time constant (4 seconds) times the number of locomotives in the consist, and to display that the bail-off is in progress and the number of seconds remaining in the bail-off cycle. The "NO" output signal of block 25 is fed to the CHARGE TIME IS EXPIRED decision block 15 which outputs a "YES" if the QRP charging timeout period has occurred and which outputs a "NO" if the charging time period has not expired. The "NO" signal of the CHARGE TIME IS EXPIRED decision block 35 is fed back to the CHARGE QRP block 23 which again attempts to charge the quick release pipe P4. The "YES" signal of the CHARGE TIME IS EXPIRED decision block 35 is fed to the QRP CHARGING-FAILED block 34 which is directly connected to the END ROUTINE block 37 to terminate the operation. Returning now to block 26, it will be seen that its output is fed to the decision block 27 if there is time remaining in the bail-off cycle and if the independent brake handle 4 has not been moved. If both of these conditions are true, the decision block 27 outputs a "YES" signal to the block 28 which function to decrement the software timer and to display the time remaining in the bail-off cycle. The output of the DECREMENT BAIL-OFF TIMER AND DISPLAY TIME REMAINING block 28 is fed back to the input of the decision block 27. The "NO" output of the decision block 27 is fed to the decision block 29 which functions to determine if the timer has timed-out or has not timed-out. As shown, the "YES" signal of the decision block 29 is fed to the BAIL-OFF REQUEST decision block 31 which functions to determine if the bail-off handle is still in the bail-off position at the end of the normal bail-off cycle. The decision block 31 outputs a "YES" signal which is fed to the RELEASE BAIL-OFF HANDLE NOW block 32 to cause the above message to be displayed on the cab display unit 7. The output of the block 32 is connected to the input of the END ROUTINE block 37 to terminate the operation. It will be seen that the "NO" signal of the decision block 31 is fed to the BAIL-OFF COMPLETE block 33 to cause the latter message to be displayed on the cab display unit 7, the output of the block 33 is connected to the END ROUTINE block 37 to terminate the operation.

Returning now to the TIMER TIMED-OUT block 29, it will be seen that the "NO" signal is fed to the HANDLE MOVED block 36 which is connected to the BAIL-OFF CYCLE block 30 to cause the message to be displayed on the cab display unit 7. The output of the block 30 is connected to the END ROUTINE block 30 to terminate the operation.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

What we claim is:

1. Apparatus for initiating and latching a bail-off request for bailing-off the brake pressure on a locomotive consist comprising, a cab control unit having a keypad, an automatic brake handle, and an independent brake handle, a central processing unit receiving a first input signal produced by said keypad of said cab control unit which signifies the number of locomotives in a consist, and receiving a second input signal produced by said independent brake handle of said cab control unit which signifies a bail-off request, a display unit receiving input signals from said central processing unit for displaying the bail-off of the brake pressure on the locomotive consist when said independent brake handle is placed in a bail-off position by the engineer.

2. The apparatus as defined in claim 1, wherein said keypad includes a set key for exhibiting a set-up screen on said display unit.

3. The apparatus as defined in claim 2, wherein said keypad includes a first key and a pair of up and down keys for setting up the pressure in an equalizing reservoir.

4. The apparatus as defined in claim 3, wherein said keypad includes a key for establishing a lead and trail mode of operation.

5. The apparatus as defined in claim 4 wherein said keypad includes another key for establishing cut-in and cut-out operation.

6. The apparatus as defined in claim 5, wherein said keypad includes yet another key for establishing passenger and freight operation.

7. The apparatus as defined in claim 6, wherein said keypad includes still another key for entering the number of locomotives in the consist.

8. The apparatus as defined in claim 7, wherein said keypad includes a clear key for resetting the last manipulated key to its original setting.

9. The apparatus as defined in claim 8, wherein said keypad includes an enter key for exhibiting a normal run-time screen of said display unit.

10. The apparatus as defined in claim 9, wherein said normal run-time screen displays the operating parameters of the locomotive consist.

11. The apparatus as defined in claim 1, wherein said apparatus includes an electropneumatic unit having a solenoid valve which causes the pressurization of a quick release pipe on the locomotive consist when a bail-off request is initiated by the engineer.

12. The apparatus as defined in claim 11, wherein said solenoid valve connects a main pressure reservoir to said quick release pipe during a bail-off request.

13. The apparatus as defined in claim 12, wherein said independent brake handle is held in said bail-off position for a predetermined time to permit completion of a bail-off cycle.

14. The apparatus as defined in claim 13, wherein said predetermined time for holding said independent brake handle in said bail-off position is dependent upon the number of locomotives in the consist.

15. The apparatus as defined in claim 13, wherein said predetermined time for holding said independent handle in said bail-off position determined by a time period equal to approximately four seconds times the number of locomotives in the consist.

* * * * *